(12) United States Patent
Tsai et al.

(10) Patent No.: US 11,562,527 B2
(45) Date of Patent: Jan. 24, 2023

(54) LABELING METHOD, LABELING DEVICE USING THE SAME, PICK-AND-PLACE SYSTEM USING THE SAME, PICK-AND-PLACE METHOD USING THE SAME AND NON-TRANSITORY COMPUTER READABLE MEDIUM USING THE SAME

(71) Applicant: INDUSTRIAL TECHNOLOGY RESEARCH INSTITUTE, Hsinchu (TW)

(72) Inventors: Cheng-Han Tsai, Hsinchu (TW); Kuo-Feng Hung, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 31 days.

(21) Appl. No.: 17/364,072

(22) Filed: Jun. 30, 2021

(65) Prior Publication Data
US 2022/0044471 A1   Feb. 10, 2022

Related U.S. Application Data

(60) Provisional application No. 63/061,843, filed on Aug. 6, 2020.

(30) Foreign Application Priority Data

Sep. 28, 2020 (TW) .................... 109133623

(51) Int. Cl.
*G06T 15/08* (2011.01)
*B65C 9/02* (2006.01)
(Continued)

(52) U.S. Cl.
CPC .............. *G06T 15/08* (2013.01); *B65C 9/02* (2013.01); *B65C 9/40* (2013.01); *G06T 7/70* (2017.01);
(Continued)

(58) Field of Classification Search
CPC ........... G06T 15/08; G06T 7/70; G06V 20/46; G06V 20/647; B65C 9/02; B65C 9/40
(Continued)

(56) References Cited

U.S. PATENT DOCUMENTS 7,983,487 B2   7/2011   Agrawal et al.
8,098,928 B2   1/2012   Ban et al.
(Continued)

FOREIGN PATENT DOCUMENTS

CN   101430192 B   12/2010
CN   107133190 A    9/2017
(Continued)

OTHER PUBLICATIONS

Abbeloos et al., "Point Pair Feature based Object Detection for Random Bin Picking", 2016 13th Conference on Computer and Robot Vision, pp. 432-439.
(Continued)

*Primary Examiner* — Hai Tao Sun
(74) *Attorney, Agent, or Firm* — Birch, Stewart, Kolasch & Birch, LLP (57) ABSTRACT

A method further includes the following steps. Firstly, a three-dimensional picture under a generated background condition is generated, wherein the three-dimensional picture includes a three-dimensional object image. Then, a two-dimensional picture of the three-dimensional picture is captured, wherein the two-dimensional picture includes a two-dimensional object image of the three-dimensional object image. Then, an object region of the two-dimensional object image is recognized. Then, an exposed ratio of an exposed area of an exposed region of the object region to an object area of the object region is obtained. Then, whether the exposed ratio is greater than a preset ratio is determined.

(Continued)

Then the exposed region is defined as the pick-and-place region when the exposed ratio is greater than the preset ratio.

13 Claims, 6 Drawing Sheets

(51) Int. Cl.
  *B65C 9/40* (2006.01)
  *G06T 7/70* (2017.01)
  *G06V 20/40* (2022.01)
  *G06V 20/64* (2022.01)

(52) U.S. Cl.
  CPC ............ *G06V 20/46* (2022.01); *G06V 20/647* (2022.01); *B65C 2009/408* (2013.01)

(58) Field of Classification Search
  USPC ........................................................ 345/419
  See application file for complete search history.

(56) References Cited

U.S. PATENT DOCUMENTS

| | | | |
|---|---|---|---|
| 9,707,682 B1 | 7/2017 | Konolige et al. | |
| 10,489,687 B2 | 11/2019 | Tsai et al. | |
| 2008/0240511 A1* | 10/2008 | Ban | G06T 1/0007 901/30 |
| 2009/0116728 A1* | 5/2009 | Agrawal | B22D 11/1265 382/153 |
| 2010/0021051 A1* | 1/2010 | Melikian | B25J 9/1697 382/153 |

FOREIGN PATENT DOCUMENTS

| | | | | |
|---|---|---|---|---|
| CN | 108202328 A | * | 6/2018 | ............ B25J 9/1656 |
| CN | 111428731 A | * | 7/2020 | ............ G06K 9/629 |
| JP | 5229253 B2 | | 7/2013 | |
| TW | 201915943 A | | 4/2019 | |
| TW | I675306 B | | 10/2019 | |
| TW | 202026594 A | | 7/2020 | |
| WO | WO 2017/055878 A1 | | 4/2017 | |
| WO | WO 2018/131108 A1 | | 7/2018 | |

OTHER PUBLICATIONS

Fan et al., "A Combined 2D-3D Vision System for Automatic Robot Picking", Proceedings of the 2014 International Conference on Advanced Mechatronic Systems, Kumamoto, Japan, Aug. 10-12, 2014, pp. 513-516.
Liu et al., "Ellipse Detection Based Bin-Picking Visual Servoing System", 2010 Chinese Conference on Pattern Recognition (CCPR), IEEE, Oct. 21-23, 2010, Chongqing, China, total 5 pages.
Martinez et al., "Automated 3D vision guided bin picking process for randomly located industrial parts", 2015 IEEE International Conference on Industrial Technology (ICIT), IEEE, Mar. 17-19, 2015, Seville, Spain, pp. 3172-3177.
Spenrath et al., "Statistical Analysis of Influencing Factors for Heuristic Grip Determination in Random Bin Picking", 2017 IEEE International Conference on Advanced Intelligent Mechatronics (AIM), Sheraton Arabella Park Hotel, Munich, Germany, Jul. 3-7, 2017, pp. 868-873.
Wu et al., "CAD-Based Pose Estimation for Random Bin-Picking of Multiple Objects Using a RGB-D Camera", 2015 15th International Conference on Control, Automation and Systems (ICCAS 2015), Oct. 13-16, 2015 in BEXCO, Busan, Korea, pp. 1645-1649.
Taiwanese Office Action and Search Report for Taiwanese Application No. 109133623, dated Apr. 13, 2022.

* cited by examiner

LABELING METHOD, LABELING DEVICE USING THE SAME, PICK-AND-PLACE SYSTEM USING THE SAME, PICK-AND-PLACE METHOD USING THE SAME AND NON-TRANSITORY COMPUTER READABLE MEDIUM USING THE SAME

This application claims the benefit of U.S. provisional application Ser. No. 63/061,843, filed Aug. 6, 2020, and Taiwan application Serial No. 109133623, filed Sep. 28, 2020, the subject matters of which are incorporated herein by references.

TECHNICAL FIELD

The disclosure relates in general to a labeling method, a labeling device using the same, a pick-and-place system using the same, a pick-and-place method using the same and a non-transitory computer readable medium using the same.

BACKGROUND

The conventional labeling method is to manually take a two-dimensional (2D) object image of a physical object, then manually label the pick-and-place region in the two-dimensional object image, and then learn the labeling information by using machine learning technology. However, machine learning usually requires a large number of the two-dimensional object images. Therefore, manual shooting for the two-dimensional object images of the physical object is time-consuming and inefficient. Therefore, how to improve the aforementioned conventional problems is one goal of the industry in this technical field.

SUMMARY

According to an embodiment, a method for automatically generating a picture and labeling a pick-and-place region in the picture is provided. The method further includes: generating a three-dimensional picture under a generated background condition, wherein the three-dimensional picture includes a three-dimensional object image; capturing a two-dimensional picture of the three-dimensional picture, wherein the two-dimensional picture includes a two-dimensional object image of the three-dimensional object image; recognizing an object region of the two-dimensional object image; obtaining an exposed ratio of an exposed area of an exposed region of the object region to an object area of the object region; determining whether the exposed ratio is greater than a preset ratio; and defining the exposed region as the pick-and-place region when the exposed ratio is greater than the preset ratio.

According to another embodiment, a device for automatically generating a picture and labeling a pick-and-place region in the picture is provided. The device includes a generator, a device camera and a labeling element. The generator is configured to generate a three-dimensional picture under a generated background condition, wherein the three-dimensional picture includes a three-dimensional object image. The device camera is configured to capture a two-dimensional picture of the three-dimensional picture, wherein the two-dimensional picture includes a two-dimensional object image of the three-dimensional object image. The labeling element is configured to: recognize an object region of the two-dimensional object image; obtain an exposed ratio of an exposed area of an exposed region of the object region to an object area of the object region; determine whether the exposed ratio is greater than a preset ratio; and define the exposed region as the pick-and-place region when the exposed ratio is greater than the preset ratio.

According to another embodiment, a pick-and-place system is provided. The pick-and-place system includes a device for automatically generating a picture and labeling a pick-and-place region in the picture, a system camera, a robotic arm and a controller. The device includes a generator configured to generate a three-dimensional picture under a generated background condition, wherein the three-dimensional picture includes a three-dimensional object image; a device camera configured to capture a two-dimensional picture of the three-dimensional picture, wherein the two-dimensional picture includes a two-dimensional object image of the three-dimensional object image; and a labeling element configured to recognize an object region of the two-dimensional object image; obtain an exposed ratio of an exposed area of an exposed region of the object region to an object area of the object region; determine whether the exposed ratio is greater than a preset ratio; and define the exposed region as a first pick-and-place region when the exposed ratio is greater than the preset ratio. The system camera is configured to capture a two-dimensional picture of a physical object, wherein the two-dimensional picture includes a two-dimensional object image. The controller electrically is connected to the device and configured to analyze the two-dimensional object image, and obtain a second pick-and-place region of the two-dimensional object image according to information of the first pick-and-place region obtained by the device; and control the robotic arm to pick and place a pick-and-place portion of the physical object corresponding to the second pick-and-place region.

According to another embodiment, a pick-and-place method is provided. The pick-and-place method includes the following steps: generating a three-dimensional picture under a generated background condition, wherein the three-dimensional picture includes a three-dimensional object image; capturing a two-dimensional picture of the three-dimensional picture, wherein the two-dimensional picture includes a two-dimensional object image of the three-dimensional object image; recognizing an object region of the two-dimensional object image; obtaining an exposed ratio of an exposed area of an exposed region of the object region to an object area of the object region; determining whether the exposed ratio is greater than a preset ratio; defining the exposed region as a first pick-and-place region when the exposed ratio is greater than the preset ratio; capturing a two-dimensional picture of a physical object, wherein the two-dimensional picture includes a two-dimensional object image; analyzing the two-dimensional object image, and obtain a second pick-and-place region of the two-dimensional object image according to information of the first pick-and-place region obtained by the device; and controlling a robotic arm to pick and place a pick-and-place portion of the physical object corresponding to the second pick-and-place region.

A non-transitory computer readable medium storing a program causing a device for automatically generating a picture and labeling pick-and-place region in the picture to execute a method for automatically generating a picture and labeling a pick-and-place region in the picture, and the method includes: generating a three-dimensional picture under a generated background condition, wherein the three-dimensional picture comprises a three-dimensional object image; capturing a two-dimensional picture of the three-dimensional picture, wherein the two-dimensional picture comprises a two-dimensional object image of the three-dimensional object image; recognizing an object region of the two-dimensional object image; obtaining an exposed ratio of an exposed area of an exposed region of the object region to an object area of the object region; determining whether the exposed ratio is greater than a preset ratio; and defining the exposed region as the pick-and-place region when the exposed ratio is greater than the preset ratio.

The above and other aspects of the disclosure will become better understood with regard to the following detailed description of the preferred but non-limiting embodiment (s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
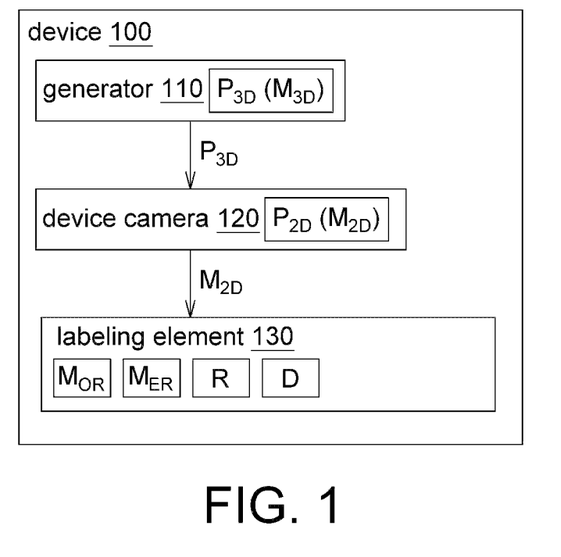
FIG. 1 shows a functional block diagram of the device for automatically generating picture and labeling a pick-and-place region in the picture according to an embodiment of the present disclosure.
Figure 2:
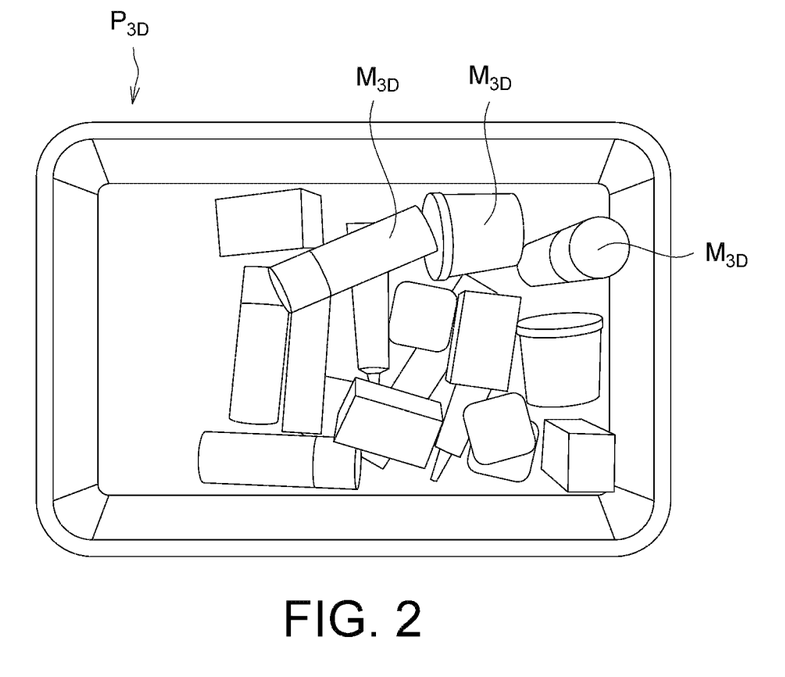
FIG. 2 shows a schematic diagram of a three-dimensional picture generated by a generator of the device of the in FIG. 1.
Figure 3:
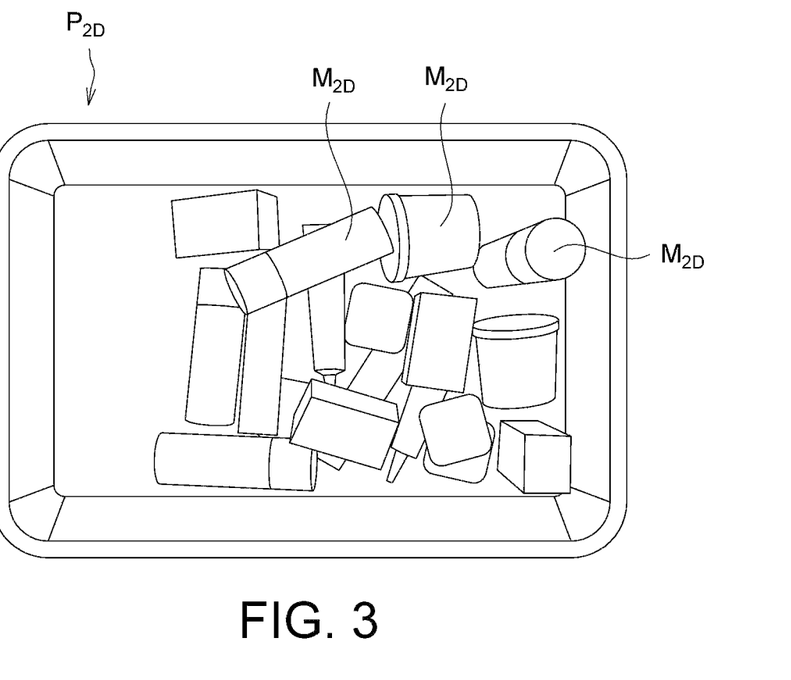
FIG. 3 shows a schematic diagram of the two-dimensional picture captured by a device camera of the device in FIG. 2.
Figure 4:
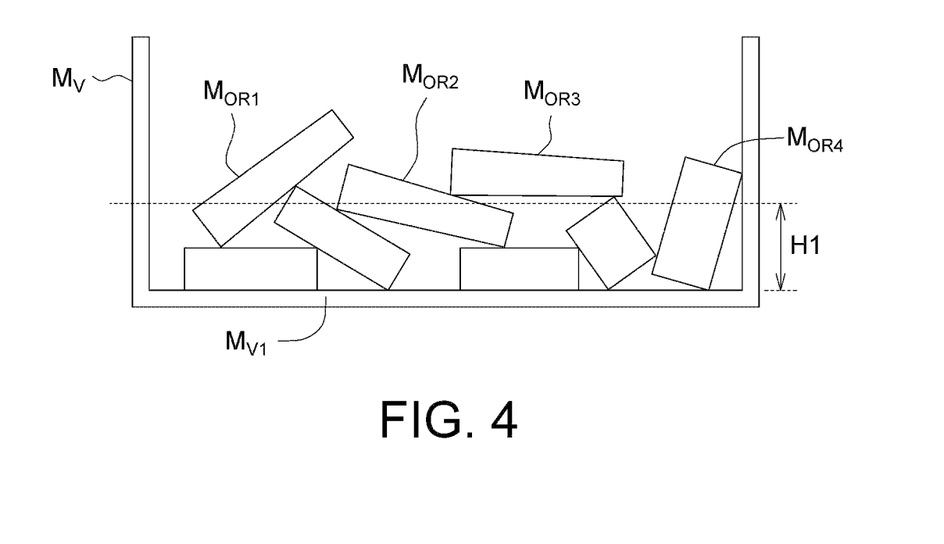
FIG. 4 shows a schematic diagram of depth perspective of the three-dimensional picture according to another embodiment of the present disclosure.
Figure 5:
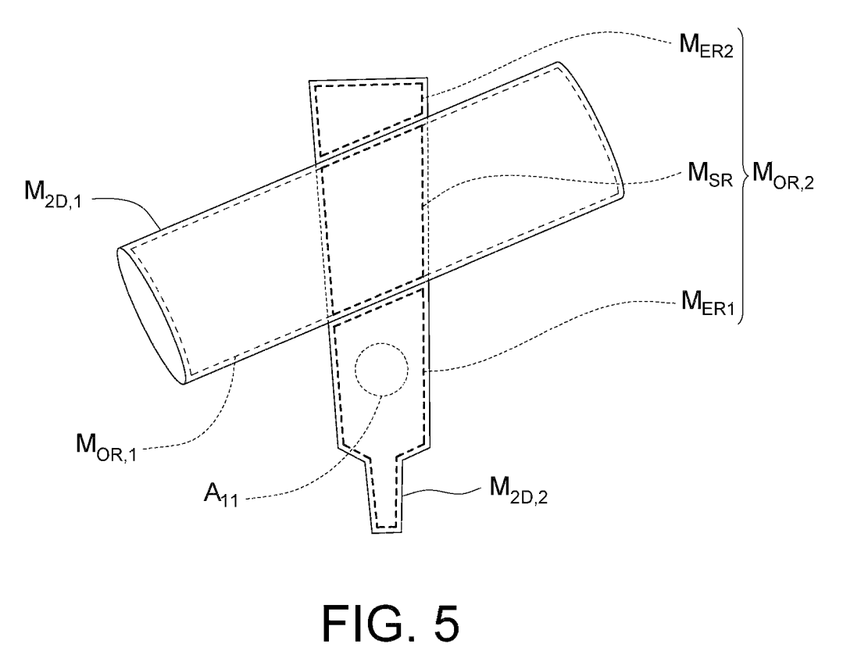
FIG. 5 shows a schematic diagram of several two-dimensional object images of FIG. 3.
Figure 6:
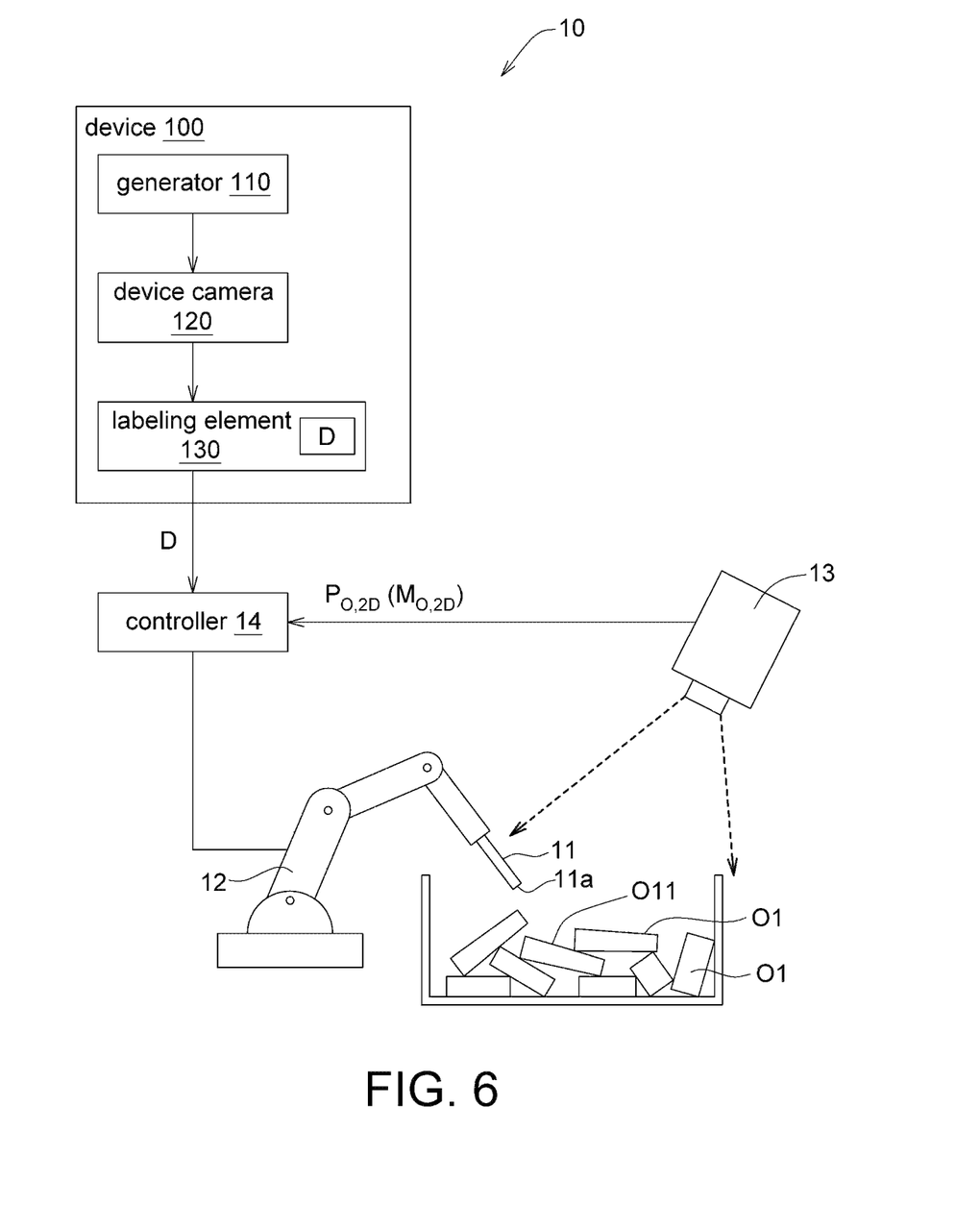
FIG. 6 shows a schematic diagram of a pick-and-place system according to the embodiment of the present disclosure.

Referring to FIGS. 1 to 6, FIG. 1 shows a functional block diagram of a device 100 for automatically generating picture and labeling a pick-and-place region in the picture according to an embodiment of the present disclosure, and FIG. 2 shows a schematic diagram of a three-dimensional (3D) picture $P_{3D}$ generated by a generator 110 of the device 100 in FIG. 1, FIG. 3 shows a schematic diagram of the two-dimensional picture $P_{2D}$ captured by a device camera 120 of the device 100 in FIG. 2, FIG. 4 shows a schematic diagram of depth perspective of the three-dimensional picture $P_{3D}$ according to another embodiment of the present disclosure, FIG. 5 shows a schematic diagram of several two-dimensional object images $M_{2D}$ of FIG. 3, and FIG. 6 shows a schematic diagram of a pick-and-place system 10 according to the embodiment of the present disclosure.

As shown in FIG. 1, the device 100 includes a generator 110, a device camera 120 and a labeling element 130. At least two of the generator 110, the device camera 120 and the label element 130 could be integrated into a single component, or at least one of the generator 110, the device camera 120 and the labeling (or marking) element 130 could be integrated into a processor (not shown) or a controller (not shown) of the device 100. At least one of the generator 110, the device camera 120 and the labeling element 130 could use, for example, a physical circuit structure (circuit), such as a semiconductor chip, a semiconductor package or other types of circuit structures, formed by semiconductor manufacturing processes.

The generator 110 is configured to generate the three-dimensional picture $P_{3D}$, wherein the three-dimensional picture $P_{3D}$ includes at least one three-dimensional object image $M_{3D}$. The device camera 120 is configured to capture the two-dimensional picture $P_{2D}$ of the three-dimensional picture $P_{3D}$, wherein the two-dimensional picture $P_{2D}$ includes the two-dimensional object image $M_{2D}$ of the three-dimensional object image $M_{3D}$. The labeling element 130 is configured to: (1) recognize an object region $M_{OR}$ of the two-dimensional object image $M_{2D}$; (2) obtain an exposed ratio R of an exposed area $A_{ER}$ of an exposed region $M_{ER}$ of the object region $M_{OR}$ to an object area $A_{OR}$ of the object region $M_{OR}$; (3). determine whether the exposed ratio R is greater than a preset ratio; and (4). define the exposed region $M_{ER}$ as a first pick-and-place region when the exposed ratio R is greater than the preset ratio. The aforementioned object area $A_{OR}$ of the object region $M_{OR}$ is, for example, the area surrounded by an outer boundary of the image of the object region $M_{OR}$. Compared with manual labeling, the present embodiment of the present disclosure uses the device 100 to label the first pick-and-place region of the two-dimensional object image.

As shown in FIG. 5, taking two-dimensional object images $M_{2D,1}$ and $M_{2D,2}$ for example, two-dimensional object images $M_{2D,1}$ overlap two-dimensional object images $M_{2D,2}$ and thus the object region $M_{OR,2}$ of two-dimensional object images $M_{2D,2}$ is partly covered by the object region $M_{OR,1}$ of two-dimensional object images $M_{2D,1}$. In detail, the object region $M_{OR,2}$ of the two-dimensional object image $M_{2D,2}$ includes a covered region $M_{SR}$, an exposed region $M_{ER1}$ and an exposed region $M_{ER2}$. The covered region $M_{SR}$ is covered by the two-dimensional object image $M_{2D,1}$, and the exposed region $M_{ER1}$ and the exposed region $M_{ER2}$ are exposed from the two-dimensional object image $M_{2D,1}$.

The labeling element 130 recognizes the range (or scope) of the object region $M_{OR,1}$, the range (or scope) of the object region $M_{OR,2}$, the range (or scope) of the covered region $M_{SR}$ of the object region $M_{OR,2}$, the range (or scope) of the exposed region $M_{ER1}$ and the exposed region $M_{ER2}$ through the image analysis technology, and obtains (or calculate) the area of the object region $M_{OR,1}$, the area of the object region $M_{OR,2}$, the area of the covered region $M_{SR}$ of the object region $M_{OR,2}$, the area of the exposed region $M_{ER1}$ and the area of the exposed region $M_{ER2}$. The aforementioned "recognizes the range" is, for example, "obtains of the coordinate of each of several pixels in the image of the region".

After obtaining the area, the labeling element 130 could obtain the exposed ratio R of the exposed area $A_{ER}$ of an exposed region $M_{ER}$ to the object area $A_{OR}$ of the object region $M_{OR}$, and define the exposed region $M_{ER}$ with the exposed ratio R greater than the preset ratio as the first pick-and-place region. For example, in FIG. 5, the exposed ratio R of the exposed region $M_{ER1}$ to the object area $A_{OR}$ is greater than the preset ratio, and thus labeling element 130 defines the exposed region $M_{ER1}$ as the first pick-and-place region, and the exposed ratio R of the exposed region $M_{ER2}$ to the object area $A_{OR}$ is not greater than the preset ratio, and thus labeling element 130 does not define the exposed region $M_{ER2}$ as the first pick-and-place region.

The embodiment of the present disclosure does not limit the value of the aforementioned preset ratio, which could be arbitrary real number between 20% and 80%, or less than 20%, such as 0%, or more than 80%, such as 100%. When the preset ratio is set to 0%, in the actual pick-and-place process, any physical objects with the exposed region could be picked and placed. When the default ratio is set to 100%, in the actual pick-and-place process, only the physical object which completely exposed could be picked and placed. The preset ratio depends on the type of the object and/or the environment in which the object is located, and it is not limited in the embodiment of the disclosure.

In an embodiment, as shown in FIG. 5, the labeling element 130 is further configured to: (1). determine whether a pick-and-place area $A_{11}$ of a pick-and-place port 11a (shown in FIG. 6) of a pick-and-place device 11 (shown in FIG. 6) is completely located within the exposed region $M_{ER}$, wherein the pick-and-place area $A_{11}$ could be a preset information; (2). define the exposed region $M_{ER}$ as the first pick-and-place region when the pick-and-place area $A_{11}$ is completely located within the exposed region $M_{ER}$. For example, as shown in FIG. 5, the labeling element 130 determines that the pick-and-place area $A_{11}$ is completely located within the exposed region $M_{ER1}$ by using image processing technology, and thus the exposed region $M_{ER1}$ is defined as the first pick-and-place region.

In an embodiment, the labeling element 130 is further configured to: (1) determine whether a depth of the three-dimensional object image $M_{3D}$ is greater than a preset depth; (2). when the depth of the three-dimensional object image $M_{3D}$ is greater than the preset depth, for the object region $M_{OR}$ whose the depth is higher than the preset depth, perform the step of recognizing the object region $M_{OR}$ of the two-dimensional object image $M_{2D}$, the step of obtaining the exposed ratio R, the step of determining whether the exposed ratio R is greater than the preset ratio, and the step of defining the exposure region $M_{ER}$ as the first pick-and-place region.

For example, as shown in FIG. 4, the three-dimensional picture $P_{3D}$ further includes a container image $M_V$, and all the three-dimensional object images $M_{3D}$ are located in the container image $M_V$. There is a high probability that a bottom three-dimensional object image $M_{3D}$ which is close to the bottom $M_{V1}$ of the container image $M_V$ is covered by an upper three-dimensional object image $M_{3D}$, and thus the bottom three-dimensional object image $M_{3D}$ could be considered negligible. Based on this, the labeling element 130 could only analyze the object regions whose depth is higher than the preset depth H1, such as the object regions $M_{OR1}$, $M_{OR2}$, $M_{OR3}$ and $M_{OR4}$. As a result, the number of three-dimensional object images $M_{3D}$ analyzed by the device 100 could be reduced, and accordingly it could speed up the analysis and reduce the time required for analysis. The method of the labeling element 130 to analyze the aforementioned object regions $M_{OR1}$, $M_{OR2}$, $M_{OR3}$, and $M_{OR4}$ is similar or the same as that of the labeling element 130 to analyze the object region $M_{OR,1}$ and the object region $M_{OR,2}$ in FIG. 5, and it will not be repeated here.

In addition, FIG. 4 is merely for showing the preset depth H1, and the device 100 actually obtains the object region whose depth is higher than the preset depth H1 by analyzing the two-dimensional picture $P_{2D}$ in FIG. 3. In addition, the labeling element 130 could analyze the object region of different two-dimensional picture $P_{2D}$ by using different preset depth H1. For example, when the objects in the two-dimensional picture $P_{2D}$ is stacked to be higher, the preset depth H1 could be higher.

In the case of the application of information D of the first pick-and-place region, as shown in FIG. 6, the labeling element 130 could output the information D of the first pick-and-place region to a digital file (not shown), or to a robotic arm 12 or the controller 14 of the pick-and-place system 10 (shown in FIG. 6). In an embodiment, the information D of the first pick-and-place region includes an object name of the object region $M_{OR}$ and the coordinate of each of several pixels of the first pick-and-place region. For the pick-and-place system 10, in the process of the pick-and-place system 10 actually picking and placing at least one physical object O1, the pick-and-place system 10 could obtain range (or position) of a pick-and-place portion O11 corresponding to the first pick-and-place region in the at least one physical object O1 according to the information D of the first pick-and-place region and conveniently/quickly pick and place the physical object O1 through the pick-and-place portion.

As shown in FIG. 2, the three-dimensional object image $M_{3D}$ is, for example, a three-dimensional object image of an object, such as container, tool, stationery, doll (such as puppets, etc.), or other object which could be picked and placed by the pick-and-place system 10. The aforementioned container is, for example, container used in various fields such as PET bottle, glass bottle, tetra-pak, water bottle, bag, etc. The aforementioned tool is, for example, tool used in various fields such as spanner, hammers, etc. The aforementioned stationery is, for example, stationery used in various fields such as pen and correction tape, stapler, etc. The present embodiment of the present disclosure does not limit the type of the object, and it could be any object that could be picked and placed by the pick-and-place system 10. In addition, the object could include hard material, soft material or a combination thereof, wherein the soft material means that the material has greater deformability or flexibility, and such material is, for example, made of paper, cloth, rubber, plastic (possibly thin) or a combination thereof. The hard material means that the material has small deformability or flexibility, and such material is made of metal, glass, plastic (possibly thick), wood, or a combination thereof.

In the present embodiment, the device camera 120 is, for example, a virtual camera. In detail, the device camera 120 is not a physical camera. The image generated by the generator 110 is the three-dimensional picture $P_{3D}$, which includes at least one three-dimensional object image $M_{3D}$. The device 100 could capture the two-dimensional object image $M_{2D}$ of the three-dimensional object image $M_{3D}$ through the device camera 120 to facilitate subsequent analysis of the first pick-and-place region of the two-dimensional object image $M_{2D}$.

In addition, the device 100 could analyze the first pick-and-place region under a generated background condition. The generated background condition include the type of light source, the number of light source, the posture of the light source, the illumination angle of the light source, the type of object, the number of object, the surface texture of the object, the posture of the object, the background environment, the viewing angle of the device camera 120 and/or the distance between the device camera 120 and the object or various simulated (or similar) environmental parameters of the actual environment in which the pick-and-place system 10 is located. The labeling element could execute random algorithms, based on any combination of the aforementioned environmental parameters, to generates, in a simulated scene of the light source, a plurality of virtual objects with the change of light-shadow in real time according to the randomly generated parameters.

In terms of light source parameters, the light source parameters are, for example, one of a directional light, a point light, a spot light, and a sky light. In addition, different light source postures could cause the virtual object (three-dimensional object image $M_{3D}$) to produce different change of light-shadow due to different lighting positions. In terms of the object posture parameter, the object posture parameter could be, for example, a combination of location information, a rotation information and a scale information represented by values of X, Y and Z axis, and the aforementioned location information could be expressed as, for example, (x, y, z) or (x, y, z, $r_x$, $r_y$, $r_z$), wherein x, y and z are the coordinate values of the X, Y and Z axes, and $r_x$, $r_y$, $r_z$ are the physical quantities that the rotations around the X, Y and/or Z axes (r represents rotation), such as an angle value.

When randomly generating the aforementioned object posture parameters, if the labeling element (simulator) being Unreal engine is taken as an example, it could use random algorithm including, for example, Random Rotator, Random Rotator from Stream, Random Float in Range, Random Float in Range from Stream, Random Point in Bounding Box to randomly generate object posture parameters of each virtual object. If the labeling element (simulator) being Unreal engine is taken as an example, the random algorithm provided by the labeling element including, for example, Random Integer, Random Integer From Stream, Random Integer in Range, Random Integer In Range From Stream; however, such exemplification is not meant to be for limiting. As long as function that could produce random output values, it could be applied to the present embodiment of the present disclosure.

In terms of environmental object parameters, the environmental object parameters are, for example, a background object located in the field of view of the device camera, such as a basket or a cart, wherein the basket itself also has defined object posture parameters, object type parameters and/or material parameters, so that the color, texture and/or size of the basket could be defined by/in the labeling element, and the type and/or size of the basket could also be a portion of the labeling information given to the basket.

Since the generated background conditions are as close to the actual environment in which the pick-and-place system 10 is located as possible, the information D of the first pick-and-place region obtained by analysis could increase the success rate (the higher the recognition accuracy rate of the first pick-and-place region is, the higher the success rate of actual pick-and-place is) of the pick-and-place system 10 actually picking and placing the physical objects.

The three-dimensional picture $P_{3D}$ in FIG. 2 is generated under a specific generated background condition. After the analysis for the three-dimensional picture $P_{3D}$ is completed, the generator 110 could change at least one of the aforementioned generated background conditions, and then generate a new three-dimensional picture $P_{3D}$, and use the same analysis method to obtain at least one of the information of the first pick-and-place region of the new three-dimensional picture $P_{3D}$. The way of the generator 110 changing the background conditions is, for example, randomly changing or changing according to a set condition, wherein the set condition is the input in advance by the user, for example.

In an embodiment, the number of three-dimensional pictures $P_{3D}$ analyzed by the device 100 is equal to or greater than one. The larger the number of three-dimensional pictures $P_{3D}$ analyzed by the device 100 under different generated background conditions is, the greater the number of samples is, and accordingly the success rate of the pick-and-place for the pick-and-place system 10 could be higher when actually picking and placing objects. The present embodiment of the present disclosure does not limit the number of three-dimensional pictures $P_{3D}$ analyzed by the device 100, and it could be any number equal to or greater than one. In an embodiment, the device 100 could continuously analyze the three-dimensional pictures $P_{3D}$ under different generated background conditions.

Figure 7:
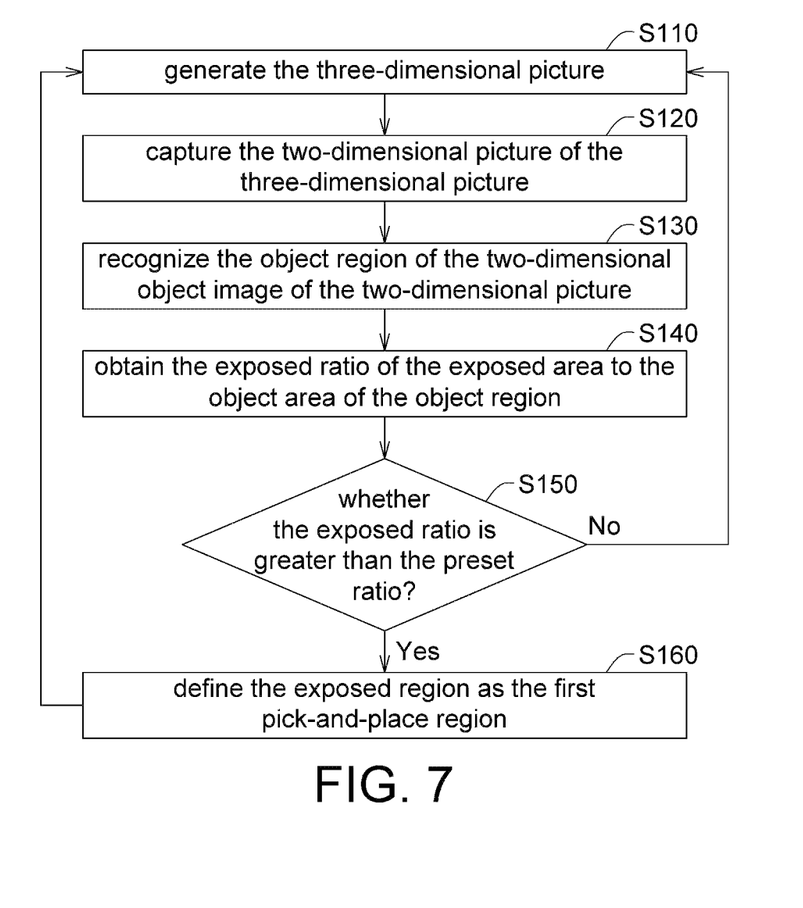
FIG. 7 shows a flowchart of the device of FIG. 6 automatically generating the picture and labeling the first pick-and-place region in the picture.

Referring to FIG. 7, FIG. 7 shows a flowchart of the device 100 of FIG. 6 automatically generating the picture and labeling the first pick-and-place region in the picture.

In step S110, as shown in FIGS. 1 and 2, the generator 110 generates the three-dimensional picture $P_{3D}$, wherein the three-dimensional picture $P_{3D}$ includes at least one three-dimensional object image $M_{3D}$.

In step S120, as shown in FIGS. 1 and 3, the device camera 120 captures the two-dimensional picture $P_{2D}$ of the three-dimensional picture $P_{3D}$, wherein the two-dimensional picture $P_{2D}$ includes the two-dimensional object image $M_{2D}$ of the three-dimensional object image $M_{3D}$.

In step S130, the labeling element 130 recognizes the object region $M_{OR}$ of the two-dimensional object image $M_{2D}$. Taking the two two-dimensional object images $M_{2D,1}$ and $M_{2D,2}$ in FIG. 5 as an example, the labeling element 130 could use image analysis technology to recognize the range of the object region $M_{OR,1}$, the range of the object region $M_{OR,2}$, the range of the covered region $M_{SR}$ of the object region $M_{OR,2}$ the range of the exposed region $M_{ER1}$ and the range of the exposed region $M_{ER2}$.

In step S140, the labeling element 130 obtains the exposed ratio R of the exposed area $A_{ER}$ of the exposed region $M_{ER}$ of the object region $M_{OR}$ to the object area $A_{OR}$ of the object region $M_{OR}$. Taking the two-dimensional object image $M_{2D,2}$ in FIG. 5 for example, the labeling element 130 could use image analysis technology to obtain (or calculate) the exposed ratio R of the exposed area $A_{ER}$ of the exposed region $M_{ER1}$ of the object region $M_{OR,2}$ to the object area $A_{OR}$ of the object region $M_{OR,2}$.

In step S150, the labeling element 130 determines whether the exposed ratio R is greater than the preset ratio. If yes, the process proceeds to step S160; if not, the generator 110 changes at least one of the aforementioned generated background conditions, and then the process returns to step S110. In an embodiment, the generator 110 could randomly change at least one of the aforementioned generated background conditions, or change at least one of the aforementioned generated background conditions according to the aforementioned set conditions, and then return to step S110. In an embodiment, after the analysis for all the two-dimensional object images $M_{2D}$ in the two-dimensional picture $P_{2D}$ is completed, or after the analysis for all the two-dimensional object images $M_{2D}$ higher than the preset depth H1 is completed, the process returns to step S110.

In step S160, the labeling element 130 defines the exposed region $M_{ER}$ as the first pick-and-place region. Taking the two-dimensional object image $M_{2D,2}$ of FIG. 5 as an example, since the exposed ratio R is greater than the preset ratio, the labeling element 130 defines the exposed region $M_{ER1}$ as the first pick-and-place region. In another embodiment, the labeling element 130 could use image processing technology to determine that the pick-and-place area $A_{11}$ is completely located within the exposed region $M_{ER1}$, and thus the exposed region $M_{ER1}$ is defined as the first pick-and-place region.

Then, the generator 110 could randomly change at least one of the aforementioned generated background conditions, or change at least one of the aforementioned generated background conditions according to the aforementioned set conditions, and then the process returns to step S110. In another embodiment, the labeling element 130 could output the object name of the first pick-and-place region and the coordinate of each of several pixels of the first pick-and-place region to the robotic arm 12 (shown in FIG. 6), the controller 14 (shown in FIG. 6) or a digital file (not shown).

As described above, the device 100 continuously analyzes several three-dimensional pictures $P_{3D}$ under different generated background conditions. The more the number of analyzed three-dimensional pictures $P_{3D}$ is (the more the number of samples), the higher the pick-and-place success rate of the pick-and-place system 10 is when actually picking and placing objects. The embodiment of the present disclosure does not limit the number of three-dimensional picture $P_{3D}$ analyzed by the device 100, and it could be any positive integer equal to or greater than one.

In an embodiment, steps S110 to S160 are automatically and/or actively completed by the device 100, and manual processing is not required in the process.

Figure 8:
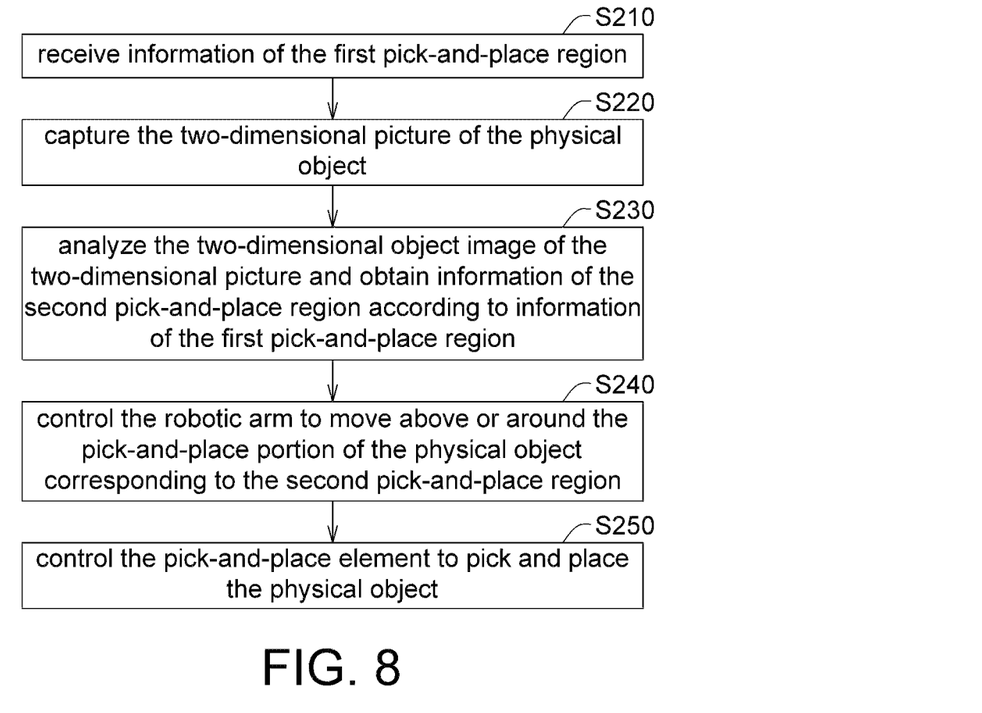
FIG. 8 shows a flowchart of the pick-and-place system of FIG. 6 picking and placing the physical object.
Figure 9:
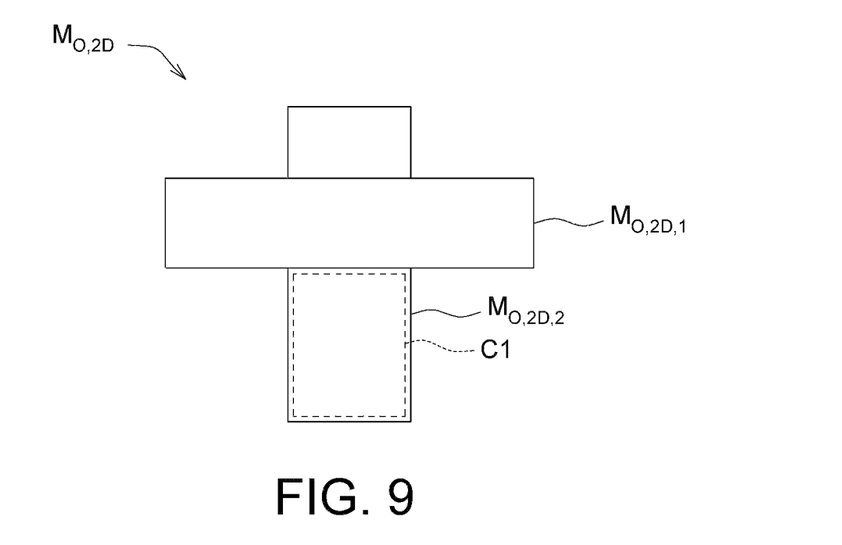
FIG. 9 shows a schematic diagram of the two-dimensional object image captured by the pick-and-place system of FIG. 6.

Referring to FIGS. 8 and 9, FIG. 8 shows a flowchart of the pick-and-place system 10 of FIG. 6 picking and placing the physical object O1, and FIG. 9 shows a schematic diagram of the two-dimensional object image $M_{O,2D}$ captured by the pick-and-place system 10 of FIG. 6.

Firstly, a pick-and-place system 10 is provided. As shown in FIG. 6, the pick-and-place system 10 includes the device 100, a pick-and-place device 11, the robotic arm 12, a system camera 13 and the controller 14. The controller 14 could be disposed outside the robotic arm 12, but could also be integrated in the robotic arm 12 or disposed in the device 100.

As shown in FIG. 6, the pick-and-place device 11 could be disposed on the robotic arm 12. In the present embodiment, the pick-and-place device 11 is, for example, a suction nozzle connected to a vacuum source (not shown), wherein the vacuum source could provide the pick-and-place device 11 with vacuum suction, so that the pick-and-place device 11 could suck the pick-and-place portion of the physical object O1. When the vacuum source does not provide the pick-and-place device 11 with the vacuum suction, the pick-and-place device 11 could release the pick-and-place portion of the physical object O1. In addition, the pick-and-place device 11 has the pick-and-place port $11a$, and the pick-and-place area $A_{11}$ of the pick-and-place port $11a$ is smaller than the area of the pick-and-place portion of the physical object O1. As a result, the physical object O1 could be sucked by the maximum suction force. In another embodiment, the pick-and-place device 11 is, for example, a magnetic attractor, and the pick-and-place device 11 could selectively provide or cut off the supply of magnetic force to pick and place the physical object O1. In another embodiment, the pick-and-place device 11 could also be a holder (or clamper) to pick and place the physical object O1 in a clamping manner.

As shown in FIG. 6, the system camera 13 is, for example, a physical camera, wherein the system camera 13 could capture two-dimensional picture $P_{O,2D}$ of at least one physical object O1, wherein the two-dimensional picture $P_{O,2D}$ includes the two-dimensional object image $M_{O,2D}$ of each physical object O1. The controller 14 is configured to: (1) analyze the two-dimensional object image $M_{O,2D}$ and obtain the second pick-and-place region of each two-dimensional object image $M_{O,2D}$ according to the information of the first pick-and-place region provided by the device 100; (2). control the robotic arm 12 to move above or around a pick-and-place portion of the physical object O1 corresponding to the second pick-and-place region; (3). control the pick-and-place device 11 to pick and place the physical object O1.

In step S210, the controller 14 receives the information D of the pick-and-place region from the device 100.

In step S220, the system camera 13 captures the two-dimensional picture $P_{O,2D}$ of the physical object O1, wherein the two-dimensional picture $P_{O,sD}$ includes at least one two-dimensional object image $M_{O,2D}$, such as the two-dimensional object images $M_{O,2D,1}$ and $M_{O,2D,2}$ as shown in FIG. 9.

In step S230, the controller 14 analyzes the two-dimensional object image $M_{O,2D}$, and obtains the second pick-and-place region of each two-dimensional object image $M_{O,2D}$ according to the information D of the first pick-and-place region provided by the device 100. Taking the two-dimensional object image $M_{O,2D,2}$ of FIG. 9 as an example, the controller 14 analyzes the two-dimensional object image $M_{O,2D,2}$ and obtains the second pick-and-place region C1 of the two-dimensional object image $M_{O,2D,2}$ according to the information D of the first pick-and-place region provided by the device 100. Since the device 100 has provided the controller 14 with the information D of at least one first pick-and-place region, the controller 14 could not need or could omit the complicated image analysis for the two-dimensional object image $M_{O,2D}$, and thus it could quickly obtain the information of the second pick-and-place region C1 of the two-dimensional object image $M_{O,2D}$, such as size and/or location, etc.

In step S240, the controller 14 controls the robotic arm 12 to move above or around the pick-and-place portion O11 (shown in FIG. 6) of the physical object O1 corresponding to the second pick-and-place region C1.

In step S250, the controller 14 controls the pick-and-place device 11 to suck the pick-and-place portion O11 of the pick-and-place device 11. In detail, the pick-and-place device 11 picks and places the physical object O1 through the pick-and-place portion O11.

In an embodiment, before step S240 in FIG. 8, the method includes a coordinate conversion process. For example, the controller 14 could convert the image coordinate to the robotic arm coordinate. In detail, after the system camera 13 captures the two-dimensional picture $P_{O,2D}$ of the physical object O1 (step S220), the controller 14 changes the two-dimensional picture coordinate of the two-dimensional picture $P_{O,2D}$ to the robotic arm coordinate of the robotic arm 12, and then controls the robotic arm 12 to pick and place the physical object O1.

In addition, in an embodiment, the processes shown in FIGS. 7 and 8 could be implemented by a computer program product (not shown) or a non-transitory computer readable medium.

In summary, in the present embodiment of the present disclosure, the device which could automatically generate a picture and label the pick-and-place region in the image could automatically generate at least one image under different background conditions, and label the first pick-and-place region in the image. The information in the first pick-and-place region could be output as a digital file or provided to the pick-and-place system for being used by the pick-and-place system. For example, the pick-and-place system captures a two-dimensional object image of a physical object, and obtains the second pick-and-place region of the two-dimensional object image according to the information of the first pick-and-place region. As a result, the physical object could be picked and placed through the pick-and-place portion of the physical object corresponding to the second pick-and-place region.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A method for automatically generating a picture and labeling a pick-and-place region in the picture, comprising:
    generating a three-dimensional picture under a generated background condition, wherein the three-dimensional picture comprises a three-dimensional object image;
    capturing a two-dimensional picture of the three-dimensional picture, wherein the two-dimensional picture comprises a two-dimensional object image of the three-dimensional object image;
    recognizing an object region of the two-dimensional object image;
    obtaining an exposed ratio of an exposed area of an exposed region of the object region to an object area of the object region;
    determining whether the exposed ratio is greater than a preset ratio;
    defining the exposed region as the pick-and-place region when the exposed ratio is greater than the preset ratio;
    outputting an object name of the pick-and-place region and a coordinate of each of a plurality of pixels of the first pick-and-place region to a robotic arm; and
    when the exposure ratio is not greater than the preset ratio, changing the generated background condition, and then returning to step of generating the three-dimensional picture.

2. The method according to claim 1, further comprises:
    determining whether a pick-and-place area of a pick-and-place port of a pick-and-place device is completely located within the exposed region;
    wherein step of defining the exposed region as the pick-and-place region further comprises:
        defining the exposed region as the pick-and-place area when the pick-and-place area is completely located within the exposed region.

3. The method according to claim 1, further comprises:
    determining whether a depth of the three-dimensional object image is greater than a preset depth; and
    when the depth of the three-dimensional object image is greater than the preset depth, for the object region whose the depth is higher than the preset depth, performing step of recognizing the object region of the two-dimensional object image, step of obtaining the exposed ratio, step of determining whether the exposed ratio is greater than the preset ratio, and step of defining the exposure region as the first pick-and-place region.

4. The method according to claim 1, wherein step of generating the three-dimensional picture, step of capturing the two-dimensional picture of the three-dimensional picture, step of recognizing the object region of the two-dimensional object image, step of obtaining the exposed ratio, step of determining whether the exposed ratio is greater than the preset ratio, and step of defining the exposure region as the first pick-and-place region are automatically performed by a device.

5. The method according to claim 1, further comprises:
    after defining the exposed region as the pick-and-place region, changing the generated background condition, and then returning to step of generating the three-dimensional picture.

6. A device for automatically generating a picture and labeling pick-and-place region in the picture, comprising:
    a generator configured to generate a three-dimensional picture under a generated background condition, wherein the three-dimensional picture comprises a three-dimensional object image;
    a device camera configured to capture a two-dimensional picture of the three-dimensional picture, wherein the two-dimensional picture comprises a two-dimensional object image of the three-dimensional object image; and
    a labeling element configured to:
        recognize an object region of the two-dimensional object image;
        obtain an exposed ratio of an exposed area of an exposed region of the object region to an object area of the object region;
        determine whether the exposed ratio is greater than a preset ratio;
        define the exposed region as the pick-and-place region when the exposed ratio is greater than the preset ratio;
        output an object name of the pick-and-place region and a coordinate of each of a plurality of pixels of the first pick-and-place region to a robotic arm; and
        when the exposure ratio is not greater than the preset ratio, changing the generated background condition, and then generating another new three-dimensional picture.

7. The device according to claim 6, wherein the labeling element is further configured to:
    determine whether a pick-and-place area of a pick-and-place port of a pick-and-place device is completely located within the exposed region; and
    define the exposed region as the pick-and-place area when the pick-and-place area is completely located within the exposed region.

8. The device according to claim 6, wherein the labeling element is further configured to:
    determine whether a depth of the three-dimensional object image is greater than a preset depth; and
    when the depth of the three-dimensional object image is greater than the preset depth, for the object region whose the depth is higher than the preset depth, performing step of recognizing the object region of the two-dimensional object image, step of obtaining the exposed ratio, step of determining whether the exposed ratio is greater than the preset ratio, and step of defining the exposure region as the first pick-and-place region.

9. The device according to claim 6, wherein the generator is further configured to:
    after defining the exposed region as the pick-and-place region, changing the generated background condition, and then generating another new three-dimensional picture.

10. A pick-and-place system, comprises:
    a device for automatically generating a picture and labeling pick-and-place region in the picture, comprising:

a generator configured to generate a three-dimensional picture under a generated background condition, wherein the three-dimensional picture comprises a three-dimensional object image;

a device camera configured to capture a two-dimensional picture of the three-dimensional picture, wherein the two-dimensional picture comprises a two-dimensional object image of the three-dimensional object image; and a labeling element configured to:
  recognize an object region of the two-dimensional object image;
  obtain an exposed ratio of an exposed area of an exposed region of the object region to an object area of the object region;
  determine whether the exposed ratio is greater than a preset ratio;
  define the exposed region as the pick-and-place region when the exposed ratio is greater than the preset ratio;
  output an object name of the pick-and-place region and a coordinate of each of a plurality of pixels of the first pick-and-place region to a robotic arm; and
  when the exposure ratio is not greater than the preset ratio, changing the generated background condition, and then generating another new three-dimensional picture;

a system camera configured to capture a two-dimensional picture of a physical object, wherein the two-dimensional picture comprises a two-dimensional object image;

the robotic arm; and a controller electrically connected to the device and configured to:
  analyze the two-dimensional object image, and obtain a second pick-and-place region of the two-dimensional object image according to information of the first pick-and-place region obtained by the device; and
  control the robotic arm to pick and place a pick-and-place portion of the physical object corresponding to the second pick-and-place region.

11. A pick-and-place method, comprises:

generating a three-dimensional picture under a generated background condition, wherein the three-dimensional picture comprises a three-dimensional object image;

capturing a two-dimensional picture of the three-dimensional picture, wherein the two-dimensional picture comprises a two-dimensional object image of the three-dimensional object image;

recognizing an object region of the two-dimensional object image;

obtaining an exposed ratio of an exposed area of an exposed region of the object region to an object area of the object region;

determining whether the exposed ratio is greater than a preset ratio;

defining the exposed region as the pick-and-place region when the exposed ratio is greater than the preset ratio;

outputting an object name of the pick-and-place region and a coordinate of each of a plurality of pixels of the first pick-and-place region to a robotic arm; and when the exposure ratio is not greater than the preset ratio, changing the generated background condition, and then returning to step of generating the three-dimensional picture;

capturing a two-dimensional picture of a physical object, wherein the two-dimensional picture comprises a two-dimensional object image;

analyzing the two-dimensional object image, and obtain a second pick-and-place region of the two-dimensional object image according to information of the first pick-and-place region obtained by the device; and controlling the robotic arm to pick and place a pick-and-place portion of the physical object corresponding to the second pick-and-place region.

12. The pick-and-place method according to claim 11, wherein before generating the three-dimensional picture, the pick-and-place system further comprises:

disposing a pick-and-place system, wherein the pick-and-place system comprises a device for automatically generating a picture and labeling pick-and-place region in the picture, a system camera, a robotic arm and a controller, the device comprises a generator, a device camera and a labeling element; wherein the generator is configured to generate a three-dimensional picture under a generated background condition, the device camera is configured to capture the two-dimensional picture of the three-dimensional picture, the labeling element is configured to recognize an object region of the two-dimensional object image, the system camera is configured to capture the two-dimensional picture of the physical object, the controller is electrically connected to the device and configured to analyze the two-dimensional object image and obtain the second pick-and-place region of the two-dimensional object image according to information of the first pick-and-place region obtained by the device, and control the robotic arm to pick and place the pick-and-place portion of the physical object corresponding to the second pick-and-place region.

13. A non-transitory computer readable medium storing a program causing a device for automatically generating a picture and labeling pick-and-place region in the picture to execute a method for automatically generating a picture and labeling a pick-and-place region in the picture, and the method comprises:

generating a three-dimensional picture under a generated background condition, wherein the three-dimensional picture comprises a three-dimensional object image;

capturing a two-dimensional picture of the three-dimensional picture, wherein the two-dimensional picture comprises a two-dimensional object image of the three-dimensional object image;

recognizing an object region of the two-dimensional object image;

obtaining an exposed ratio of an exposed area of an exposed region of the object region to an object area of the object region;

determining whether the exposed ratio is greater than a preset ratio;

defining the exposed region as the pick-and-place region when the exposed ratio is greater than the preset ratio;

outputting an object name of the pick-and-place region and a coordinate of each of a plurality of pixels of the first pick-and-place region to a robotic arm; and when the exposure ratio is not greater than the preset ratio, changing the generated background condition, and then returning to step of generating the three-dimensional picture.

* * * * *